United States Patent
Ohmuro et al.

(10) Patent No.: US 10,175,528 B2
(45) Date of Patent: Jan. 8, 2019

(54) LIQUID CRYSTAL PANEL, LIQUID CRYSTAL DISPLAY DEVICE, AND REFLECTIVE POLARIZING PLATE AND MANUFACTURING METHOD THEREOF

(71) Applicant: FUJIFILM Corporation, Tokyo (JP)

(72) Inventors: Katsufumi Ohmuro, Kanagawa (JP); Yukito Saitoh, Kanagawa (JP); Takashi Yonemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/399,298

(22) Filed: Jan. 5, 2017

(65) Prior Publication Data

US 2017/0115528 A1 Apr. 27, 2017

Related U.S. Application Data

(63) Continuation of application No. PCT/JP2015/069612, filed on Jul. 8, 2015.

(30) Foreign Application Priority Data

Jul. 8, 2014 (JP) ................................ 2014-140734

(51) Int. Cl.
*G02F 1/1335* (2006.01)
*G02B 5/30* (2006.01)

(52) U.S. Cl.
CPC ....... *G02F 1/133536* (2013.01); *G02B 5/305* (2013.01); *G02F 1/133621* (2013.01); *G02B 5/3033* (2013.01); *G02F 2001/133531* (2013.01); *G02F 2001/133562* (2013.01); *G02F 2001/133567* (2013.01); *G02F 2001/133614* (2013.01); *G02F 2202/022* (2013.01); *G02F 2202/36* (2013.01)

(58) Field of Classification Search
CPC .......... G02F 1/13362; G02F 1/133621; G02F 1/133615; G02F 1/133536
See application file for complete search history.

(56) References Cited

U.S. PATENT DOCUMENTS

| | | | |
|---|---|---|---|
| 6,184,955 B1 * | 2/2001 | Okumura .......... | G02F 1/133528 349/162 |
| 6,400,432 B2 * | 6/2002 | Kuroiwa .......... | G02F 1/133536 349/117 |

(Continued)

FOREIGN PATENT DOCUMENTS

| JP | 3448626 B2 | 9/2003 |
|---|---|---|
| JP | 2009-137289 A | 6/2009 |

(Continued)

OTHER PUBLICATIONS

International Search Report issued in connection with International Patent Application No. PCT/JP2015/069612 dated Sep. 15, 2015.

(Continued)

*Primary Examiner* — Dung Nguyen
(74) *Attorney, Agent, or Firm* — Edwards Neils LLC; Jean C. Edwards, Esq.

(57) ABSTRACT

An aspect of the present invention relates to a liquid crystal panel including a visible side polarizing plate, a liquid crystal cell, and a backlight side polarizing plate, in which the backlight side polarizing plate is a reflective polarizing plate of which a degree of polarization $P_{550\ nm}$ with respect to light at a wavelength of 550 nm is greater than or equal to 99.90%, and the reflective polarizing plate and the liquid crystal cell are integrally laminated, a liquid crystal display device, and a reflective polarizing plate and a manufacturing method thereof.

17 Claims, 1 Drawing Sheet

(56) References Cited

U.S. PATENT DOCUMENTS

| | | | |
|---|---|---|---|
| 6,747,716 B2* | 6/2004 | Kuroiwa | G02F 1/133536 |
| | | | 345/94 |
| 7,176,619 B2* | 2/2007 | Miyachi | G02B 5/30 |
| | | | 313/506 |
| 2009/0142516 A1 | 6/2009 | Sasada | |
| 2012/0206935 A1 | 8/2012 | Seo et al. | |

FOREIGN PATENT DOCUMENTS

| | | |
|---|---|---|
| JP | 2012-169271 A | 9/2012 |
| JP | 2014-112621 A | 6/2014 |
| JP | 2014-124845 A | 7/2014 |

OTHER PUBLICATIONS

Written Opinion issued in connection with International Patent Application No. PCT/JP2015/069612 dated Sep. 15, 2015.

International Preliminary Report on Patentability issued by WIPO dated Jan. 19, 2017, in connection with International Patent Application No. PCT/JP2015/069612.

Notification of Reasons for Refusal issued by the Japanese Patent Office (JPO) dated Nov. 7, 2017, in connection with corresponding Japanese Patent Application No. 2016-532952.

Decision of Refusal issued by the Japanese Patent Office dated Feb. 13, 2018, in connection with corresponding Japanese Patent Application No. 2016-532952.

* cited by examiner

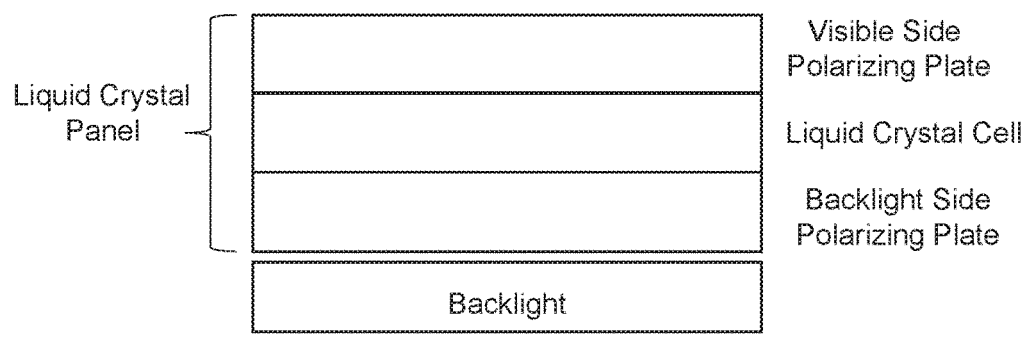

— LIQUID CRYSTAL PANEL, LIQUID
CRYSTAL DISPLAY DEVICE, AND
REFLECTIVE POLARIZING PLATE AND
MANUFACTURING METHOD THEREOF

CROSS-REFERENCE TO RELATED
APPLICATIONS

This application is a Continuation of PCT International Application No. PCT/JP2015/069612 filed on Jul. 8, 2015, which was published under PCT Article 21(2) in Japanese and which claims priority under 35 U.S.C § 119(a) to Japanese Patent Application No. 2014-140734 filed on Jul. 8, 2014. The above applications are hereby expressly incorporated by reference, in their entirety, into the present application.

BACKGROUND OF THE INVENTION

1. Field of the Invention

The present invention relates to a liquid crystal panel, and specifically, relates to a liquid crystal panel in which a reflective polarizing plate and a liquid crystal cell are integrally laminated.

Further, the present invention relates to a liquid crystal display device including the liquid crystal panel described above, and a reflective polarizing plate which can be integrally disposed with a liquid crystal cell, and a manufacturing method thereof.

2. Description of the Related Art

A liquid crystal display device (hereinafter, also referred to as a liquid crystal display (LCD)) has been annually widely used as a space saving image display device having low power consumption. The liquid crystal display device is configured of a backlight unit including a backlight, and a liquid crystal panel including a liquid crystal cell, and in general, the liquid crystal panel includes a member such as a pair of polarizing plates (a backlight side polarizing plate and a visible side polarizing plate) sandwiching the liquid crystal cell therebetween.

In order to increase a light utilization efficiency according to power saving of backlight, it has been proposed that a reflective polarizing plate which transmits only light vibrating in a specific polarization direction among light rays incident thereon while vibrating in all directions, and reflects light vibrating in the other polarization direction is disposed between the backlight and the backlight side polarizing plate of the liquid crystal cell (for example, refer to the specification of JP3448626B). The reflective polarizing plate described above can contribute to improvement of brightness (a degree of brightness per unit area of a light source), and thus, is referred to as a brightness enhancement film, and is expected to be an essential component of a low-power LCD according to an increase in a mobile device and a reduction in power consumption of household electrical goods.

SUMMARY OF THE INVENTION

However, in the middle-sized and small-sized LCD market of a tablet personal computer (PC), a mobile usage, or the like, which has been rapidly widened recently, thinning is highly required. The flow of thinning affects the large-sized LCD market dominated by a television. Under such circumstances, thinning an LCD has been considered according to various means such as thinning glass or a film configuring an LCD or thinning a member by functional integration.

Therefore, an object of the present invention is to provide a novel method for enabling a liquid crystal display device to be thinned.

The present inventors have conducted intensive studies in order to attain the object described above, and have reached a novel concept not in the related art that the reflective polarizing plate described above which is disposed as the constituent of the backlight unit in the related art is used as the polarizing plate of the liquid crystal panel, and thus, the member can be thinned by functional integration, and more specifically, the brightness enhancement film disposed in the backlight unit and the polarizing plate disposed in the liquid crystal panel can be thinned by functional integration. However, it has found that a new problem occurs in which a liquid crystal display device having high front contrast (hereinafter, contrast will be also referred to as CR) cannot be obtained by only simply replacing the polarizing plate of the liquid crystal panel by a reflective polarizing plate which is generally used in the backlight unit.

Therefore, as a result of more intensive studies of the present inventors for solving the new problem described above, it has been newly found that the problem described above is solved by integrally laminating a reflective polarizing plate of which a degree of polarization $P_{550\ nm}$ with respect to light at a wavelength of 550 am is greater than or equal to 99.90% as the reflective polarizing plate with the liquid crystal cell, and thus, the present invention has been completed.

An aspect of the present invention relates to a liquid crystal panel, comprising: a visible side polarizing plate; a liquid crystal cell; and a backlight side polarizing plate, in which the backlight side polarizing plate is a reflective polarizing plate of which a degree of polarization $P_{550\ nm}$ with respect to light at a wavelength of 550 nm is greater than or equal to 99.90%, and the reflective polarizing plate and the liquid crystal cell are integrally laminated. Here, in the present invention, "being integrally laminated" is used as the meaning excluding a state in which the reflective polarizing plate is simply disposed on the liquid crystal cell without using adhesive or pressure sensitive adhesive. For example, a state in which the surface of the liquid crystal cell adheres onto the surface of the reflective polarizing plate by an interlayer for bonding two layers, such as an easily adhesive layer and a pressure sensitive adhesive layer, a state in which the surface of the liquid crystal cell adheres onto the surface of the reflective polarizing plate by lamination processing using an adhesive or lamination processing not using an adhesive (thermocompression bonding), and the like are included in "being integrally laminated". By being integrally laminated as described above, it is possible to exclude the presence of air on an interface between the liquid crystal cell and the reflective polarizing plate (or to reduce the amount of air mixed into the interface to a trace amount) and to set the reflective polarizing plate to have an extremely high degree of polarization, and thus, it is possible to make thinning obtained by using the reflective polarizing plate as the polarizing plate of the liquid crystal panel and improvement of front contrast compatible.

In the aspect, in the reflective polarizing plate, a degree of polarization $P_{450\ nm}$ with respect to light at a wavelength of 450 nm, a degree of polarization $P_{550\ nm}$ with respect to at a wavelength of 550 nm, and a degree of polarization $P_{630\ nm}$ with respect to light at a wavelength of 630 nm satisfy at least one of Expression (1) or (2) described below, and preferably satisfy both of Expressions (1) and (2) described below.

$$0.0\% \leq |P_{450\,nm} - P_{550\,nm}| < 0.1\% \quad (1)$$

$$0.0\% \leq |P_{550\,nm} - P_{630\,nm}| < 0.1\% \quad (2)$$

In the reflective polarizing plate, the degree of polarization $P_{550\,nm}$ at a wavelength of 550 nm which is a wavelength in a so-called green light range is high, which is greater than or equal to 99.90%. A difference between the degree of polarization $P_{550\,nm}$ and the degree of polarization $P_{450\,nm}$ at a wavelength of 450 nm which is a wavelength in a so-called blue light range being small (Expression (1)) and a difference between the degree of polarization $P_{550\,nm}$ and the degree of polarization $P_{630\,nm}$ at a wavelength of 630 nm which is a wavelength in a so-called red light range being small (Expression (2)) indicate that both of the degree of polarization $P_{450\,nm}$ and the degree of polarization $P_{630\,nm}$ are high. By combining such a reflective polarizing plate with the polarizing plate (for example, a polyvinyl alcohol-based film) which is generally used in the liquid crystal panel, it is possible to realize a black color without having coloration (or having small coloration) in front black display (to improve a front black tint). Such a viewpoint has been newly found by the present inventors.

According to the aspect, the liquid crystal cell and the reflective polarizing plate are integrally laminated through at least one easily adhesive layer.

According to the aspect, the reflective polarizing plate includes a stretched film of a laminate of two or more layers selected from the group consisting of a polyethylene naphthalate film and a polyethylene terephthalate film as a reflective polarizer. A polarizing plate including a polyvinyl alcohol-based film as a polarizer is widely used as the polarizing plate of the liquid crystal panel. However, moisture-heat resistance of polyvinyl alcohol is not necessarily sufficient. For this reason, in particular, in a case where the polarizing plate including the polyvinyl alcohol-based film as the polarizer is disposed on the backlight side, the polarizing plate is easily deformed due to heat from the backlight. The liquid crystal panel is warped due to the deformation of the backlight side polarizing plate, and in a case where the backlight unit which is disposed with a space from the backlight side polarizing plate is partially in contact with the backlight side polarizing plate, in-plane unevenness occurs in the amount of moisture of the polarizing plate, and unevenness due to a stress is visually recognized according to humidity dependency of a contraction percentage of polyvinyl alcohol. Further, it is considered that a distortion due to factors described above is propagated to a layer or a film (for example, a phase difference layer or a film referred to as a so-called low retardation film) included in the liquid crystal panel, and thus, unevenness occurs. More specifically, the unevenness is a light leakage due to Retardation=Distortion×Photoelasticity×Film Thickness according to an internal stress distortion, and hereinafter, will be referred to as photoelastic unevenness. In contrast, the reflective polarizing plate, for example, can include a reflective polarizer formed of a thermoplastic resin other than polyvinyl alcohol, such as polyethylene naphthalate or polyethylene terephthalate. Therefore, according to the reflective polarizing plate including such a reflective polarizer, it is possible to reduce photoelastic unevenness which can occur in a case where the polarizing plate including the polyvinyl alcohol-based film as the polarizer is used as the backlight side polarizing plate.

In the aspect, the visible side polarizing plate configuring the liquid crystal panel along with the reflective polarizing plate includes a polyvinyl alcohol-based film as a polarizer.

In the aspect, the visible side polarizing plate and the backlight side polarizing plate (the reflective polarizing plate) are arranged such that transmission axes thereof are orthogonal to each other.

In the aspect, the reflective polarizing plate has a reflectivity peak in one or more wavelength ranges selected from the group consisting of a wavelength range of 400 to 499 nm, a wavelength range of 500 to 599 nm, and a wavelength range of 600 to 750 nm, and preferably has a reflectivity peak in each of the three wavelength ranges described above.

Another aspect of the present invention relates to a liquid crystal display device, comprising: the liquid crystal panel described above; and a backlight unit.

In the aspect, the backlight unit emits at least blue light which has a light emission center wavelength in a wavelength range of 400 to 499 nm and has alight emission intensity peak having a half-width of less than or equal to 100 nm.

In the aspect, the backlight unit emits blue light which has a light emission center wavelength in a wavelength range of 400 to 499 nm and has a light emission intensity peak having a half-width of less than or equal to 100 nm, green light which has a light emission center wavelength in a wavelength range of 500 to 599 nm and has a light emission intensity peak having a half-width of less than or equal to 100 nm, and red light which has a light emission center wavelength in a wavelength range of 600 to 700 nm and has a light emission intensity peak having a half-width of less than or equal to 100 nm.

In the aspect, the backlight unit includes a wavelength conversion member containing a quantum dot which is excited by exciting light and emits fluorescent light.

In the aspect, the quantum dot contained in the wavelength conversion member is at least one type selected from the group consisting of a quantum dot A having a light emission center wavelength in a wavelength range of 600 nm to 700 nm, a quantum dot B having a light emission center wavelength in a wavelength range of 500 nm to 599 nm, and a quantum dot C having a light emission center wavelength in a wavelength range of 400 nm to 499 nm.

In the aspect, the backlight unit includes a light source emitting blue light which has a light emission center wavelength in a wavelength range of 400 to 499 nm and has a light emission intensity peak having a half-width of less than or equal to 100 nm, the wavelength conversion member contains the quantum dot A and the quantum dot B, and the wavelength conversion member is disposed between the light source and the liquid crystal panel.

In the aspect, the backlight unit includes alight source emitting ultraviolet light which has a light emission center wavelength in a wavelength range of 300 to 400 nm and has a light emission intensity peak having a half-width of less than or equal to 100 nm, the wavelength conversion member contains the quantum dot A, the quantum dot B, and the quantum dot C, and the wavelength conversion member is disposed between the light source and the liquid crystal panel.

Still another aspect of the present invention relates to a reflective polarizing plate of which a degree of polarization $P_{550\,nm}$ with respect to light at a wavelength of 550 nm is greater than or equal to 99.90%.

In the aspect, the reflective polarizing plate satisfies at least one of Expression (1) or (2) described above, and preferably satisfies both of Expressions (1) and (2) described above.

In the aspect, the reflective polarizing plate is a multilayer film which has a reflectivity peak in one or more wavelength ranges selected from the group consisting of a wavelength range of 400 to 499 nm, a wavelength range of 500 to 599 nm, and a wavelength range of 600 to 750 nm, and preferably has a reflectivity peak in each of the three wavelength ranges described above, and allows linearly polarized light to exit.

Further still another aspect of the present invention relates to a manufacturing method of the reflective polarizing plate described above, in which the reflective polarizing plate is a stretched film obtained by stretching a laminate of two or more layers of films, the stretched film is prepared through a stretching step which includes a stretching step in at least a film width direction and arbitrarily includes a stretching step in a film longitudinal direction, and in the stretching step in the film width direction, the laminate of the two or more layers of films is sequentially subjected to a stretching treatment under a first heating treatment, a cooling treatment, and a second heating treatment.

In the aspect, the second heating treatment is performed at a heating temperature higher than or equal to a heating temperature of the first heating treatment.

In the aspect, the laminate is a laminate of two or more layers selected from the group consisting of a polyethylene naphthalate film and a polyethylene terephthalate film.

According to the present invention, it is possible to provide a liquid crystal panel enabling a liquid crystal display device to be thinned, and a thinned liquid crystal display device including the liquid crystal panel.

BRIEF DESCRIPTION OF THE DRAWING

The sole FIGURE illustrates an example of a liquid crystal display panel according to an aspect the present invention.

DESCRIPTION OF THE PREFERRED EMBODIMENTS

The following description is based on representative embodiments of the present invention, but the present invention is not limited to such embodiments. Furthermore, in the present invention and herein, a numerical range represented by using "to" indicates a range including numerical values before and after "to" as the lower limit value and the upper limit value.

In addition, in the present invention and herein, a "half-width" of a peak indicates the width of a peak at ½ of a peak height. In addition, light having a light emission center wavelength in a wavelength range of 400 to 499 nm, preferably in a wavelength range of 430 to 480 nm will be referred to as blue light, light having a light emission center wavelength in a wavelength range of 500 to 599 nm will be referred to as green light, and light having a light emission center wavelength in a wavelength range of 600 to 700 nm will be referred to as red light. Light having a light emission center wavelength in a wavelength range of 300 to 400 nm, preferably in a wavelength range of 300 to 380 nm will be referred to as ultraviolet light.

Furthermore, herein, "visible light" indicates light in a range of 380 nm to 780 nm. In addition, herein, in a case where a measurement wavelength is not particularly described, the measurement wavelength is 550 nm.

In addition, herein, an angle (for example, an angle such as "90°") and a relationship thereof (for example "orthogonal", "parallel", "intersecting", and the like) include an error range which is allowable in the technology field to which the present invention belongs. For example, the angle indicates a range of less than an exact angle ±10°, and an error with respect to the exact angle is preferably less than or equal to 5°, and is more preferably less than or equal to 3°. In addition, herein, "front" indicates a normal direction with respect to a display surface.

[Liquid Crystal Panel]

An aspect of the present invention relates to a liquid crystal panel including a visible side polarizing plate, a liquid crystal cell, and a backlight side polarizing plate, in which the backlight side polarizing plate is a reflective polarizing plate of which a degree of polarization $P_{550\ nm}$ with respect to light at a wavelength of 550 nm is greater than or equal to 99.90%, and the reflective polarizing plate and the liquid crystal cell are integrally laminated. (Please see the sole FIGURE). As described above, the liquid crystal panel described above can contribute to thinning of a liquid crystal display device.

Hereinafter, the liquid crystal panel described above will be described in more detail.

(Backlight Side Polarizing Plate)

The liquid crystal panel includes the visible side polarizing plate, the liquid crystal cell, and the backlight side polarizing plate, and arbitrarily, can include various layers which can be generally included in the liquid crystal panel, such as a protective film and a phase difference layer. As described above, in the liquid crystal panel according to the aspect of the present invention, the backlight side polarizing plate is the reflective polarizing plate of which the degree of polarization $P_{550\ nm}$ with respect to the light at a wavelength of 550 nm is greater than or equal to 99.90%. By incorporating the liquid crystal panel in which the reflective polarizing plate having a degree of polarization $P_{550\ nm}$ of greater than or equal to 99.90%, for example, in a range of 99.90% to 99.99% is integrally laminated on the liquid crystal cell as the backlight side polarizing plate, it is possible to obtain a liquid crystal display device having high front contrast. It is preferable that the degree of polarization $P_{550\ nm}$ becomes higher from the viewpoint of further improving front contrast. From this viewpoint, the degree of polarization $P_{550\ nm}$ is preferably greater than or equal to 99.93%, and is more preferably 99.95%.

Furthermore, in the liquid crystal display device, in general, using a value at a wavelength of 550 nm as a center value is general on design, as a representative value of brightness (a Y value) for calculating black brightness or CR. Therefore, as described above, in the degree of polarization, the degree of polarization $P_{550\ nm}$ at a wavelength of 550 nm is adopted as an index. By including the reflective polarizing plate of which the degree of polarization $P_{550\ nm}$ is greater than or equal to 99.90% as the backlight side polarizing plate, for example, it is possible to realize front contrast of greater than or equal to 1,000 as front contrast measured by a method described in examples described below. The front contrast is preferably greater than or equal to 2,000, and is more preferably greater than or equal to 3,000, and it is preferable that the front contrast becomes higher.

The degree of polarization in the present invention is a value measured by using a spectrophotometer. A measurement method can be referred to a measurement method of a degree of polarization of a polarizing plate of Japan Electronics and Information Technology Industries Association Standards EIAJ ED-2521B 5-18. In a case where a transmittance at the time of combining two polarizing plates (reflective polarizing plates) such that directions of absorption axes of the polarizing plates are parallel to each other is set to Tp, and a transmittance in a case of combining the polarizing plates such that the directions of the absorption axes of the polarizing plates are orthogonal to each other is set to Tc, a degree of polarization is obtained by the following expression.

$$\text{Degree of Polarization [\%]} = \sqrt{\frac{Tp - Tc}{Tp + Tc}} \times 100$$

As described above, the reflective polarizing plate is a brightness enhancement film and is used as a constituent of a backlight unit, and in the related art, the backlight side polarizing plate is separately disposed in the liquid crystal cell. Therefore, the reflective polarizing plate is not required to have a function as the backlight side polarizing plate, and thus, the reflective polarizing plate having a high degree of polarization $P_{550\ nm}$ of greater than or equal to 99.90% is not known in the related art.

In contrast, the present inventors have enabled the reflective polarizing plate to be used as the backlight side polarizing plate by increasing the degree of polarization $P_{550\ nm}$ of the reflective polarizing plate to be greater than or equal to 99.90%. Hereinafter, this viewpoint will be described in more detail.

In order to improve the degree of polarization, various means can be used by being arbitrarily combined. Among them, as a result of intensive studies of the present inventors with respect to an aspect in which a reflective polarizer included in the reflective polarizing plate is a stretched film, it has been newly found that when the stretched film is prepared through a stretching step including a stretching step in at least a film width (horizontal) direction, in the stretching step in the film width direction, it is possible to increase the degree of polarization $P_{550\ nm}$ of the reflective polarizing plate to be greater than or equal to 99.90% by a stretching step in which a stretching treatment under a first heating treatment, a cooling treatment, and a second heating treatment are sequentially performed. Furthermore, the stretching step described above includes the stretching step in at least the film width direction, and arbitrarily, can include a stretching step in a film longitudinal (vertical) direction. Thus, a stretching step including the stretching step in the film width direction and the stretching step in the longitudinal direction, will be generally referred to as biaxial stretching. In the biaxial stretching, the order of stretching in the film longitudinal direction and stretching in the film width direction is not particularly limited, but in general, the stretching in the film longitudinal direction is performed, and then, the stretching in the film width direction is performed.

It is considered that the reason that an extremely high degree of polarization can be attained by the step described above is because orientation of molecules in the film can be higher by performing the cooling treatment with respect to the film stretched in the width direction under the first heating treatment, and a distortion in the film can be removed by continuously performing the second heating treatment. Furthermore, the stretching technology described above is proposed as bowing reduction means of a thermoplastic film (for example, refer to JP4636263B, JP2841816B, and JP2841817B), but it has been newly found that increasing the degree of polarization of the reflective polarizing plate to be extremely high can be attained by the stretching technology described above as a result of intensive studies of the present inventors. The present inventors have considered that in-plane axial accuracy of the reflective polarizing plate is required to be improved in order to improve the degree of polarization of the reflective polarizing plate, and bowing which is an axial shift is required to be reduced in order to improve the in-plane axial accuracy, and thus, have found that the findings described above. In addition, it has been considered that increasing dimensional stability of the film by the stretching step described above also contributes to improvement of the degree of polarization.

The stretching step in the width direction described above can be performed by referring to the description of each specification of JP4636263B, JP2841816B, and JP2841817B described above. Hereinafter, a preferred aspect will be described, but the present invention is not limited to the aspect described below, and the stretching step in the width direction is performed by referring to the description of each specification described above, and thus, it is possible to obtain the reflective polarizing plate having an extremely high degree of polarization of 99.90%.

The film which becomes a stretching target, in general, is prepared by performing extrusion (multilayer co-extrusion) molding with respect to a laminate (a laminate film) of two or more thermoplastic resin films. The prepared laminate film is stretched in the film longitudinal direction. The preparation of the laminate film and the stretching in the longitudinal direction described above can be performed by the same method as that of a general manufacturing step of the reflective polarizing plate. Such a step, for example, can be referred to JP3448626B. Furthermore, the aspect described here as an example is an aspect in which biaxial stretching is performed, but as described above, the stretching step may include the stretching step in at least the film width direction, and the stretching step in the film longitudinal direction is a step which can be arbitrarily performed. In addition, in a case where the biaxial stretching is performed, it is preferable that a stretching ratio of the stretching step in the film width direction is set to be greater than or equal to a stretching ratio of the stretching step in the film longitudinal direction, and it is more preferable that the stretching ratio of the stretching step in the film width direction is set to be higher than the stretching ratio of the stretching step in the film longitudinal direction.

Next, the laminate film stretched in the longitudinal direction is sent to the stretching step in the film width direction. The stretching step in the width direction is performed by preferably continuously performing the stretching treatment under the first heating treatment, the cooling treatment, and the second heating treatment described above, for example, with respect to the film which is continuously fed. It is preferable that the stretching treatment under the first heating treatment is performed at a heating temperature of Tg−10° C. to Tg+50° C. with respect to a glass transition temperature Tg of a thermoplastic resin configuring the film from the viewpoint of realizing an advanced orientation state. A heating temperature of the first heating treatment is more preferably from Tg−5° C. to Tg+40° C., and is even more preferably from Tg to Tg+30° C.

Furthermore, the glass transition temperature Tg is a value measured by using a differential scanning calorimetry (DSC). For example, a resin which is a measurement target is put into a measurement pan, and the resin is heated from 30° C. to 300° C. at 10° C./minute in the nitrogen stream (1st-run), and then, is cooled to 30° C. at −10° C./minute, and is heated again from 30° C. to 300° C. at 10° C./minute (2nd-run). A temperature at which a base line starts to be biased from a low temperature side in the 2nd-run can be obtained as the glass transition temperature Tg. On the other hand, a crystallization temperature Tc described below is also a value measured by using a differential scanning calorimetry (DSC). For example, a resin which is a measurement target is put into a measurement pan, and the resin is heated from 30° C. to 300° C. at 10° C./minute in the nitrogen stream, and then, is cooled to 30° C. at −10° C./minute, and thus, a temperature at which a base line starts to be biased from a high temperature side can be obtained as the crystallization temperature Tc. In the laminate film, the glass transition temperature Tg and the crystallization temperature Tc indicate Tg and Tc of at least one type of resin configuring the laminated film, and preferably indicate values at the highest temperature of Tg and Tc of a plurality of resins. In a case where different resins are used as the resin configuring the laminate film, it is preferable that a difference in Tg and Tc of each of the resins is small, and it is preferable that a difference in at least one of Tg or Tc is lower than or equal to 40° C., and it is more preferable that a difference in both of Tg and Tc is lower than or equal to 40° C. In addition, a heating temperature and a cooling temperature of the present invention indicate an atmospheric temperature at which the heating treatment or the cooling treatment is performed.

On the other hand, it is preferable that the cooling treatment is performed at a temperature of lower than the glass transition temperature Tg of the thermoplastic resin configuring the laminate filth from the viewpoint of excellently immobilizing the orientation state which is realized by the stretching treatment under the first heating treatment. The cooling temperature is more preferably in a range of Tg−50° C. to Tg−2° C., and is even more preferably in a range of Tg−30° C. to Tg−5° C.

The second heating treatment which is performed after the cooling treatment described above is preferably performed at a temperature of higher than or equal to the glass transition temperature Tg of the thermoplastic resin configuring the film. Accordingly, a distortion in the film can be removed, and thus, an extremely high degree of polarization can be realized. In addition, it is preferable that the heating treatment described above is performed at a temperature lower than the crystallization temperature Tc of the thermoplastic resin configuring the film from the viewpoint of further improving the degree of polarization. This is because bowing easily occurs by a heat treatment at a temperature of higher than or equal to Tc. A heating temperature of the second heating treatment is more preferably in a range of Tg to Tg+50° C., and is even more preferably in a range of Tg to Tg+ 30° C. Furthermore, according to the heating treatment at the heating temperature described above, the film can be thermally relaxed. Here, the thermal relaxation indicates that a film is subjected to a heating treatment, and thus, a stress distortion in the film is removed (relaxed), and indicates that being different from acceleration of crystallization by performing a heat treatment at a temperature of higher than or equal to the crystallization temperature in a state of thermal immobilization, that is, in a state of maintaining a setting ratio at the time of performing stretching, or in a state of applying a tension to the film. The film is continuously thermally relaxed to the stretching treatment and the cooling treatment, and thus, it is possible to considerably increase the degree of polarization of the stretched film (the reflective polarizing plate). In addition, the heating temperature of the second heating treatment is preferably higher than or equal to the heating temperature of the first heating treatment, and is preferably higher than the heating temperature of the first heating treatment.

It is preferable that the laminate film stretched by the steps described above is a laminate of two or more types of thermoplastic resin films having different birefringences. A laminate film of two or more types of thermoplastic resin films having different birefringences, for example, can exhibit properties as a reflective polarizer through the stretching step described above. The reflective polarizer has a function of transmitting light in a first polarization state and of reflecting light in a second polarization state among incidence rays. The light in the first polarization state which exits by being transmitted through the reflective polarizer is incident on the liquid crystal cell, and the light in the second polarization state which is reflected by the reflective polarizer is recirculated by randomizing the direction and the polarization state thereof by a reflective member (also referred to as a light guide and an optical resonator) in the backlight unit. Accordingly, it is possible to improve brightness of a display surface of a liquid crystal display device. That is, the reflective polarizing plate included in the liquid crystal panel according to the aspect of the present invention as the backlight side polarizing plate can also function as a brightness enhancement film.

Examples of the thermoplastic resin used in the laminate film described above are preferably include crystalline naphthalene dicarboxylic acid polyester such as polyethylene naphthalate (PEN), polyethylene terephthalate (PET), copolyester (coPEN) of a naphthalene dicarboxylic acid and a terephthalic acid or an isophthalic acid, and the like. The details of a preferred thermoplastic resin can be referred to line 11 on page 24 to line 34 on page 25 of the specification of JP3448626B. Films of two different types of resins may be alternately laminated, or films of three or more different resins can also be laminated. Examples of the preferred laminate film can include a laminate film of two or more layers selected from the group consisting of a polyethylene naphthalate film and a polyethylene terephthalate film. The number of laminated layers, for example, is greater than or equal to 100 layers, is preferably less than 1,000 layers, is more preferably less than 500 layers, and is even more preferably less than 300 layers from the viewpoint of thinning the reflective polarizing plate. In addition, it is preferable that a film thickness of the reflective polarizing plate (a multilayer film) obtained through the stretching step is thin in a range where a film hardness can be maintained. From this viewpoint, the film thickness of the reflective polarizing plate is preferably in a range of 5 to 100 μm, is more preferably in a range of 10 to 50 μm, and is particularly preferably in a range of 5 to 20 μm.

The reflective polarizing plate including the reflective polarizer which is the multilayer film obtained by stretching the laminated film described above can allow linearly polarized light to exit. A transmission axis of the reflective polarizing plate and a transmission axis of a visible side polarizing plate are disposed to be orthogonal to each other, and thus, are disposed in crossed nicols, and here, in a case where the wavelength dispersion of the degree of polarization of the reflective polarizing plate is large, and the degree of polarization is considerably different according to a wavelength, coloration occurs on front black display of the liquid crystal display device (a front black tint decreases).

Therefore, it is preferable that the wavelength dispersion of the degree of polarization of the reflective polarizing plate is small. More specifically, in the wavelength dispersion of the degree of polarization, a degree of polarization $P_{\lambda 1}$ at a certain wavelength of λ1 and a degree of polarization $P_{\lambda 2}$ at a wavelength of λ2 on a wavelength side longer than λ1 can be represented by the following expression:

$$|P_{\lambda 1} - P_{\lambda 2}|,$$

the wavelength dispersion increases as a value calculated by the expression described above becomes larger, and the wavelength dispersion decreases as the value becomes smaller. In the reflective polarizing plate included in the liquid crystal panel according to the aspect of the present invention, in order to enable a black color not being colored (or being slightly colored) to be realized on front black display, a degree of polarization $P_{450\ nm}$ with respect to light at a wavelength of 450 nm, a degree of polarization $P_{550\ nm}$ with respect to light at a wavelength of 550 nm, and a degree of polarization $P_{630\ nm}$ with respect to light at a wavelength of 630 nm preferably satisfy Expression (1) or (2) described below, and more preferably satisfy Expressions (1) and (2) described below.

$$0.00\% \leq |P_{450\ nm} - P_{550\ nm}| < 0.10\% \quad (1)$$

$$0.00\% \leq |P_{550\ nm} - P_{630\ nm}| < 0.10\% \quad (2)$$

It is more preferable that Expressions (1) and (2) described above are Expressions (1-1) and (2-1) described below.

$$0.00\% < |P_{450\ nm} - P_{550\ nm}| < 0.10\% \quad (1\text{-}1)$$

$$0.00\% < |P_{550\ nm} - P_{630\ nm}| < 0.10\% \quad (2\text{-}1)$$

The wavelength dispersion described above can be adjusted by controlling a temperature according to a manufacturing step. In the temperature control, it is preferable that the heating temperature of the second heating treatment is higher than the first heating temperature.

In addition, in multilayer co-extrusion before the stretching step, when the laminated film is subjected to multilayer co-extrusion, the laminated film is divided into a plurality of regions (film units) such as a region from a layer positioned on the lowermost layer to an A layer, a region from a B layer adjacent to the A layer to a C layer, and a region from a D layer adjacent to the C layer to the uppermost layer, and extruding conditions are changed according to each of the film units, and thus, it is possible to obtain a laminated film including a plurality of film units having different film thicknesses. Thus, the film thickness is controlled in the plurality of film units, and the film units are divided into film units contributing to improvement of a degree of polarization at various wavelengths, such as a film unit contributing to improvement of a degree of polarization at a wavelength of 550 mm which is a wavelength in a green light range, a film unit contributing to improvement of a degree of polarization at a wavelength of 450 nm which is a wavelength in a blue light range, and a film unit contributing to improvement of a degree of polarization at a wavelength of 630 nm which is a wavelength in a red light range, and each film thickness thereof is adjusted, and thus, it is possible to adjust the wavelength dispersion. The number of film units, for example, can be defined as at least 3 to contribute to improvement of the degree of polarization in 3 wavelength ranges described above. In addition, the number of film units is defined as greater than 3, and thus, it is possible to more finely adjust the wavelength dispersion. As an example, the film units are divided into 8 film units, and the film thickness is adjusted in each of the film units, and thus, it is possible to realize a high degree of polarization in a wide wavelength range of a visible range (a wavelength of 380 nm to 780 nm). This viewpoint is preferable as the backlight side polarizing plate of the liquid crystal display device including a white light source described below in the backlight unit. In addition, in each of the film units, it is preferable that a thickness of a plurality of films included in the unit is homogeneously changed at the time of performing extrusion. In the plurality of film units, the type of film to be laminated or the number of laminations can be changed. In addition, in a general polarizing plate, a degree of polarization in a blue light range in which a high degree of polarization is not easily realized can be improved by relatively increasing the number of laminations of a film having a function of reflecting light in the blue light range.

In the aspect described above, the reflective polarizing plate including the reflective polarizer which is a stretched film has been described, but the reflective polarizing plate disposed as the backlight side polarizing plate in the liquid crystal panel according to the aspect of the present invention is not limited to the aspect described above. For example, a wire grid type polarizing plate which is a reflective polarizing plate allowing linearly polarized light to exit can also be used. The wire grid polarizing plate is a reflective polarizing plate including a reflective polarizer (a wire grid type polarizer) which transmits one polarized light ray according to birefringence of a metal thin wire, and reflects the other polarized light ray. The wire grid type polarizer is obtained by periodically arranging metal wires at regular intervals, and is mainly used as a polarizer in a terahertz wave range. In order to allow a wire grid to function as a polarizer, it is necessary to sufficiently decrease the wire interval to be shorter than a wavelength of an incident electromagnetic wave. A polarization component in a polarization direction parallel to a longitudinal direction of the metal wire is reflected on the wire grid polarizer, and a polarization component in a polarization direction perpendicular to the longitudinal direction of the metal wire is transmitted through the wire grid polarizer. The wire grid type polarizer is commercially available as a commercially available product. Examples of the commercially available product include a wire grid polarization filter 50×50, NT46-636, manufactured by Edmund Optics Inc., and the like.

In addition, the other aspect of the reflective polarizing plate can include a reflective polarizing plate allowing circularly polarized light to exit. By laminating two or more cholesteric liquid crystal layers, it is possible to obtain a reflective polarizing plate which transmits one of right circularly polarized light and left circularly polarized light, and reflects the other circularly polarized light. The details of such a reflective polarizing plate can be referred to the specification of EP606940A2, JP1996-271731A (JP-H08-271731A), and the like. Furthermore, in a case where the reflective polarizing plate of this aspect is the backlight side polarizing plate, and the visible side polarizing plate is a linear polarizing plate, a λ/4 plate is disposed between the reflective polarizing plate and the liquid crystal cell, and thus, right or left circularly polarized light exiting from the reflective polarizing plate can be incident on the liquid crystal cell by being converted into linearly polarized light. A known λ/4 plate can be used as such a λ/4 plate.

The reflective polarizing plate can be formed of only the reflective polarizer described above, and can arbitrarily include other layers such as a protective film. The layers which can be arbitrarily included can be referred to the following description.

(Bonding Between Liquid Crystal Cell and Reflective Polarizing Plate)

In the liquid crystal panel according to the aspect of the present invention, the reflective polarizing plate described above and the liquid crystal cell are integrally laminated. Bonding for integrally laminating the reflective polarizing plate and the liquid crystal cell can be performed through an interlayer for bonding two layers, such as an easily adhesive layer and a pressure sensitive adhesive layer. A refractive index difference between the interlayer and the reflective polarizing plate is preferably less than or equal to 1.5, and is more preferably less than or equal to 1.0, from the viewpoint of preventing the loss of light on the interface. Furthermore, the refractive index of the reflective polarizing plate indicates an average in-plane refractive index measured on the surface of the reflective polarizing plate which becomes a surface to be bonded to the interlayer. In addition, a refractive index in the present invention indicates a refractive index with respect to a FRAUNHOFER e ray (546.1 nm). The thickness of the interlayer is preferably less than or equal to 50 μm, is more preferably less than or equal to 25 μm, is even more preferably less than or equal to 10 μm, and is still more preferably less than 5 μm, from the viewpoint of thinning a liquid crystal display device. In addition, it is preferable that the thickness of the interlayer is greater than or equal to 1 μm from the viewpoint of adhesiveness.

A method of bonding the reflective polarizing plate to the liquid crystal cell is not particularly limited, and a known method can be used. In addition, it is preferable that a roll-like reflective polarizing plate is bonded onto the liquid crystal cell by a so-called roll-to-panel manufacturing method from the viewpoint of improving productivity and a yield. The roll-to-panel manufacturing method, for example, can be referred to JP2011-48381A, JP2009-175653A, JP4628488B, JP4729647B, WO2012/014602A1, WO2012/014571 A1, and the like, but is not limited to the methods described in the publications described above. Furthermore, a known method can be used in bonding between the liquid crystal cell and the visible side polarizing plate or bonding between other films and other layers or films without any limitation.

In order to form the interlayer described above, a known adhesive composition and a known pressure sensitive adhesive composition can be used. The details thereof, for example, can be referred to paragraphs 0056 to 0058 of JP2012-189818A and paragraphs 0061 to 0063 of JP2012-133296A. Furthermore, the interlayer described above may be a single layer or a laminate of two or more layers. In addition, in the liquid crystal panel according to the aspect of the present invention, a liquid crystal display device, a polarizing plate, and a polarizing plate protective film, a known adhesive composition and a known pressure sensitive adhesive composition can be used in a case of performing bonding between layers and members. In addition, as described above, the liquid crystal cell and the reflective polarizing plate can be bonded by lamination processing using an adhesive or lamination processing not using an adhesive (thermocompression bonding).

Hereinafter, an aspect of an easily adhesive layer which is preferable as the interlayer described above will be described, and as described above, a known layer can be used as the interlayer, and thus, the present invention is not limited to the aspect described below.

The easily adhesive layer can be formed as the outermost layer of at least one of the surface of the liquid crystal cell (a surface onto which the reflective polarizing plate is bonded) or the surface of the reflective polarizing plate (a surface onto which the liquid crystal cell is bonded). In consideration of workability of rebonding when a bonding defect occurs (a residue of a pressure sensitive adhesive with respect to the liquid crystal cell), it is preferable that the easily adhesive layer is formed as the outermost layer of the reflective polarizing plate, and it is more preferable that the easily adhesive layer is formed only as the outermost layer of the reflective polarizing plate.

In general, the easily adhesive layer is formed by being coated with a coating liquid formed of a binder, a curing agent, and a surfactant. In addition, the easily adhesive layer may suitably contain organic or inorganic fine particles.

The binder used in the easily adhesive layer is not particularly limited, and polyester, polyurethane, an acrylic resin, a styrene butadiene copolymer, a polyolefin resin, and the like are preferable from the viewpoint of an adhesion force. In addition, it is particularly preferable that the binder has water solubility or water dispersibility from the viewpoint of a small environmental load.

The easily adhesive layer can contain metal oxide particles exhibiting conductivity by electronic conduction. A general metal oxide can be used as metal oxide particles, and examples of the metal oxide include ZnO, $TiO_2$, $SnO_2$, $Al_2O_3$, $In_2O_3$, MgO, BaO, $MoO_3$, a composite oxide thereof, a metal oxide in which a small amount of a hetero element is further contained in the metal oxides described above, and the like. Among such metal oxides, $SnO_2$, ZnO, $TiO_2$, and $In_2O_3$ are preferable, and $SnO_2$ is particularly preferable. A π-electron conjugated conductive polymer such as a polythiophene-based polymer may be contained instead of the metal oxide particles exhibiting conductivity by electronic conduction.

By adding any one of the metal oxide particles exhibiting conductivity by electronic conduction and the π-electron conjugated conductive polymer to the easily adhesive layer, it is possible to adjust the surface electrical resistance of the liquid crystal panel, for example, to be less than or equal to $10^{12}$ Ω/square. Accordingly, the liquid crystal panel can obtain sufficient antistatic properties and to prevent dust or grime from being adsorbed.

In order to adjust the refractive index of the easily adhesive layer, the easily adhesive layer may contain fine particles of a metal oxide. A metal oxide having a high refractive index, such as tin oxide, zirconium oxide, zinc oxide, titanium oxide, cerium oxide, and niobium oxide is preferable as the metal oxide. This is because the refractive index can be changed by a small amount of a metal oxide as the refractive index becomes higher. A particle diameter of the fine particles of the metal oxide is preferably in a range of 1 nm to 50 nm, and is more preferably in a range of 2 nm to 40 nm. The amount of the fine particles of the metal oxide may be determined according to a target refractive index, and when the mass of the easily adhesive layer is set to 100%, it is preferable that the fine particles are contained in the easily adhesive layer such that the amount of the fine particles is in a range of 10% to 90% on a mass basis, and it is more preferable that the fine particles are contained in the easily adhesive layer such that the amount of the fine particles is in a range of 30% to 80%.

The thickness of the easily adhesive layer can be controlled by adjusting the coating amount of the coating liquid for forming the easily adhesive layer. In order to exhibit a high transparency and an excellent adhesion force, it is preferable that the thickness is in a range of 0.01 to 5 μm. By setting the thickness to be greater than or equal to 0.01 μm, it is possible to more reliably improve an adhesion force compared to a case where the thickness is less than 0.01 μm.

By setting the thickness to be less than or equal to 5 µm, it is possible to form an easily adhesive layer having a more homogeneous thickness compared to a case where the thickness is greater than 5 µm. Further, an increase in the use amount of the coating liquid is suppressed, and thus, it is possible to prevent a drying time from being prolonged and to suppress an increase in cost. A more preferred range of the thickness of the easily adhesive layer is 0.02 µm to 3 µm. In addition, the easily adhesive layer may be obtained by laminating two or more layers in the thickness range described above.

However, recently, in the flat panel display market, improvement of color reproducibility has been progressed as improvement of LCD performance. In this viewpoint, recently, a quantum dot (QD, also referred to as a quantum point) has been received attention as a light emitting material. For example, in a case where exciting light (ultraviolet light or bright line light from a blue light emitting diode (LED)) is incident on a layer containing a quantum dot from a backlight, the quantum dot is excited and emits fluorescent light. Here, by using quantum dots having different light emitting properties, it is possible to embody white light by emitting each light of red light, green light, and blue light. The fluorescent light from the quantum dot has a small half-width, and thus, white light to be obtained has high brightness and excellent color reproducibility. A color reproduction range expands from a national television system committee (NTSC) ratio of 72% to 100% according to progress of three-wavelength light source technology using such a quantum dot. In an aspect where light exiting from a white light source is incident on the backlight side polarizing plate (the reflective polarizing plate), the reflective polarizing plate is required to exhibit reflective polarization properties with respect to light in a wide wavelength range included in the white light, and the reflective polarizing plate may exhibit reflective polarization properties with respect to each color light insofar as each color light of blue light, green light, and red light is emitted from the backlight unit using the quantum dot. In order to exhibit the reflective polarization properties with respect to the light in the wide wavelength range, the number of laminations of the reflective polarizing plate increases, and as described above, and it is possible to thin the reflective polarizing plate insofar as it is sufficient that reflective polarization properties are exhibited with respect to light at a specific wavelength. This viewpoint contributes to thinning of a liquid crystal panel, and a liquid crystal display device including the liquid crystal panel. Therefore, in a preferred aspect, it is preferable that the liquid crystal panel described above is used in combination with a backlight unit including a wavelength conversion member containing a quantum dot. In this case, it is preferable that the reflective polarizing plate has a reflectivity peak in one or more wavelength ranges selected from the group consisting of a wavelength range of 400 to 499 nm, a wavelength range of 500 to 599 nm, and a wavelength range of 600 to 750 nm, and it is more preferable that the reflective polarizing plate has a reflectivity peak in each of the three wavelength ranges described above. It is even more preferable that the reflective polarizing plate has a sharp reflectivity peak with respect to each color light. More specifically, it is even more preferable that the reflective polarizing plate has a reflective center wavelength in a wavelength range of 400 to 499 nm and a reflectivity peak having a half-width of less than or equal to 150 nm, has a reflective center wavelength in a wavelength range of 500 to 599 nm and a reflectivity peak having a half-width of less than or equal to 150 nm, and has a reflective center wavelength in a wavelength range of 600 to 700 nm and a reflectivity peak having a half-width of less than or equal to 150 nm. Accordingly, it is possible to further improve front contrast. The half-width of the reflectivity peak is more preferably less than or equal to 100 nm, and is even more preferably less than or equal to 80 nm.

(Visible Side Polarizing Plate)

The visible side polarizing plate is not particularly limited, and a polarizing plate which is generally used in a liquid crystal display device can be used without any limitation. The visible side polarizing plate is preferably a polarizing plate including a polarizer (a so-called absorptive polarizer) having properties in which light transmitted through the liquid crystal cell is turned on and off and light not transmitted through the liquid crystal cell is absorbed. Hereinafter, unless otherwise particularly stated, the polarizer indicates an absorptive polarizer. In contrast, the polarizer included in the backlight side polarizing plate, as described above, is a reflective polarizer having a function of reflecting light in the first polarization state and of transmitting light in the second polarization state among incidence rays.

For example, a polarizing plate including a stretched film which is stretched by dipping a polyvinyl alcohol film in an iodine solution, and the like as the polarizer can be used as the visible side polarizing plate. The thickness of the polarizer is not particularly limited. It is preferable that the thickness of the polarizer becomes thinner from the viewpoint of thinning a liquid crystal display device, and it is preferable that the polarizer has a constant thickness in order to maintain contrast of the polarizing plate. From the viewpoint described above, thickness of the polarizer (a visible side polarizer) included in the visible side polarizing plate is preferable in a range of 0.5 µm to 80 µm, is more preferably in a range of 0.5 µm to 50 µm, and is even more preferably in a range of 1 µm to 25 µm. In addition, the thickness of the visible side polarizer and the thickness of the polarizer (the reflective polarizer) included in the backlight side polarizing plate may be identical to each other, or may be different from each other. It is preferable that the thickness of the visible side polarizer and the thickness of the backlight side polarizer are different from each other from the viewpoint of suppressing warping of the liquid crystal panel. The details of the polarizer which can be used in the visible side polarizing plate can be referred to paragraphs 0037 to 0046 of JP2012-189818A. Furthermore, a known circularly polarizing plate can also be used as the visible side polarizing plate.

However, as described above, polyvinyl alcohol has deteriorated moisture-heat resistance, and thus, in particular, in a case where the polarizer included in the polarizing plate which is disposed on the backlight side is a polyvinyl alcohol-based film, the polarizing plate is easily deformed due to heat from the backlight, and as a result thereof, photoelastic unevenness is visually recognized. In contrast, in the liquid crystal panel according to the aspect of the present invention, the backlight side polarizing plate is the reflective polarizing plate described above. As described above, the reflective polarizing plate can be configured of a material other than the polyvinyl alcohol-based film. Accordingly, according to an aspect of the present invention, it is possible to reduce the photoelastic unevenness described above.

(Protective Film)

In general, the polarizing plate includes a protective film on one surface or both surfaces of the polarizer. Even in the liquid crystal panel according to the aspect of the present invention, each of the visible side polarizing plate and the backlight side polarizing plate may include a protective film on one surface or both surface's thereof. The thickness of the protective film can be suitably set, and in general, the thickness of the protective film is approximately 1 to 500 µm, is preferably 1 to 300 µm, is more preferably 5 to 150 µm, and is even more preferably 5 to 100 µm, from the viewpoint of a hardness, workability such as handling, thinning, and the like. Furthermore, the visible side polarizer and the backlight side polarizer (the reflective polarizer) may also be bonded to the liquid crystal cell without using the protective film.

A thermoplastic resin having excellent transparency, excellent mechanical strength, excellent heat stability, excellent moisture blocking properties, excellent isotropy, and the like is preferably used as the protective film of the polarizing plate. Examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyacrylate resin, a polystyrene resin, a polyvinyl alcohol resin, and a mixture thereof. Here, the (meth)acrylic resin is used as the meaning including an acrylic resin and a methacrylic resin. The cellulose resin, the cyclic polyolefin resin, and the (meth)acrylic resin are preferable. The cellulose resin can be referred to paragraph 0049 of JP2012-189818A, the cyclic polyolefin resin can be referred to paragraphs 0050 and 0051 of JP2012-189818A, and the (meth)acrylic resin can be referred to paragraphs 0052 to 0054 of JP2012-189818A.

In addition, a protective film including one or more functional layers on a thermoplastic resin film can be used as the polarizing plate protective film. Examples of the functional layer include a layer of low moisture permeability, a hard coat layer, an antireflection layer (a layer of which the refractive index is adjusted, such as a layer of low refractive index, a layer of intermediate refractive index, and a layer of high refractive index), an antiglare layer, an antistatic layer, a ultraviolet ray absorptive layer, and the like. A known technology can be applied to the functional layer. A layer thickness of the protective film including the functional layer, for example, is in a range of 5 to 100 µm, is preferably in a range of 10 to 80 µm, and is more preferably in a range of 5 to 60 µm. Furthermore, only the functional layer can be directly laminated on the polarizer without using a thermoplastic resin film. In this case, by performing film formation such that the thickness of the functional layer is approximately 1 to 20 µm, it is possible to form a thin polarizing plate. In addition, the polarizer and the protective film can be bonded by a known adhesive layer or a known pressure sensitive adhesive layer. The details thereof, for example, can be referred to paragraphs 0056 to 0058 of JP2012-189818A and paragraphs 0061 to 0063 of JP2012-133296A.

(Phase Difference Layer)

The visible side polarizing plate and the backlight side polarizing plate can include at least one phase difference layer between the visible side polarizing plate or the backlight side polarizing plate and the liquid crystal cell. For example, the phase difference layer may be included as an inner side polarizing plate protective film on the liquid crystal cell side. A known cellulose acylate film or the like can be used as such a phase difference layer.

(Liquid Crystal Cell)

A driving mode of the liquid crystal cell is not particularly limited, and various modes such as a twisted nematic (TN) more, a super twisted nematic (STN) mode, a vertical alignment (VA) mode, an in-plane switching (IPS) mode, and an optically compensated bend cell (OCB) mode can be used.

In general, the liquid crystal cell includes two substrates, and a liquid crystal layer positioned between the two substrates. In general, the substrate is a glass substrate, and may be a plastic substrate or a laminate of glass and plastic. In a case where the substrate is formed only of plastic, a material which rarely has optical anisotropy in the plane, such as polycarbonate (PC) and polyether sulfone (PES), is useful since such material does not inhibit polarization control of the liquid crystal layer. The thickness of one substrate is generally in a range of 50 µm to 2 mm.

In general, the liquid crystal layer of the liquid crystal cell is formed by sealing a space which is formed by sandwiching a spacer between the two substrates with liquid crystals. In general, a transparent electrode layer is formed on the substrate as a transparent film containing a conductive substance. There is a case in which layers such as a gas barrier layer, a hard coat layer, and an undercoat layer used in adhesion of the transparent electrode layer are disposed in the liquid crystal cell. Such layers, in general, are disposed on the substrate.

In the liquid crystal panel according to the aspect of the present invention described above, the reflective polarizing plate which can function as a brightness enhancement film also functions as the backlight side polarizing plate, and thus, it is possible to provide a thinned liquid crystal display device, compared to a case where the brightness enhancement film and the backlight side polarizing plate are respectively disposed.

[Liquid Crystal Display Device]

Another aspect of the present invention relates to a liquid crystal display device including the liquid crystal panel described above, and a backlight unit. The details of the liquid crystal panel are as described above.

(Backlight Unit)

The backlight unit may be an edge light mode backlight unit or may be a direct backlight mode backlight unit. The light source is not particularly limited, and for example, a light emitting diode (LED) can be used.

In one aspect, a white light source can be used as a light source. Here, white light of the present invention includes not only light homogeneously containing each wavelength component in a visible light range (a wavelength of 380 to 780 nm) but also light which does not homogeneously contain each wavelength component but is seen in white with naked eye. The white light may include light in a specific wavelength range such as red light, green light, and blue light which are reference colors.

A light source containing a fluorescent material can be used as the light source in order to emit light in at least a part of a wavelength range. In addition, the light source can include a light emitting diode (LED) along with the fluorescent material. A blue light emitting diode emitting blue light, a green light emitting diode emitting green light, a red light emitting diode emitting red light, and the like can be used as the light emitting diode. Among them, it is preferable to use the blue light emitting diode emitting blue light from the viewpoint of energy conversion (a power-wavelength conversion efficiency).

Examples of such a light source can include a light source including a blue light emitting diode (a blue LED) emitting blue light, a fluorescent material emitting green light by using the blue light emitted from the blue LED as exciting light, and a fluorescent material emitting red light by using the blue light emitted from the blue LED as exciting light. Alternatively, examples of such a light source can include a light source including a light emitting diode (a UV-LED) emitting ultraviolet light, a fluorescent material emitting blue light by using the ultraviolet light emitted from the UV-LED as exciting light, a fluorescent material emitting green light, and a fluorescent material emitting red light, and a light source (a pseudo white LED) including a blue LED and a fluorescent material (a yellow fluorescent body and the like) emitting light having a peak in a wide range over a green light range to a red light range by using the blue light emitted from the blue LED as exciting light. It is more preferable that the light source includes the fluorescent material emitting light by using the blue light emitted from the blue LED as the exciting light. In one aspect, a quantum dot can be used as the fluorescent material. Alternatively, a fluorescent material other than the quantum dot can be used.

In another aspect, a light source emitting blue light or a light source emitting ultraviolet light at a wavelength of 300 to 400 nm, and preferably at a wavelength of 300 to 380 nm can be used as the light source, and a wavelength conversion member containing at least one type of quantum dot can be disposed between the light source and the liquid crystal panel, from the viewpoint of expanding a color reproduction range of a liquid crystal display device. The quantum dot includes a quantum dot having various light emitting properties, and a known quantum dot includes a quantum dot A having a light emission center wavelength in a wavelength range of 600 nm to 700 nm, a quantum dot B having a light emission center wavelength in a wavelength range of 500 nm to 599 nm, and a quantum dot C having a light emission center wavelength in a wavelength range of 400 nm to 499 nm. The quantum dot A is excited by exciting light and emits red light, the quantum dot B emits green light, and the quantum dot C emits blue light. For example, in a case where a light source emitting blue light is used, the quantum dot A emitting red light and the quantum dot B emitting green light are used in the wavelength conversion member as the quantum dot, and thus, it is possible to embody white light by emitting blue light from the light source, and red light and green light emitted from the quantum dots A and B which are excited by the blue light. Alternatively, in a case where a light source emitting ultraviolet light at a wavelength of 300 to 400 nm, and preferably at a wavelength of 300 to 380 nm, is used, the quantum dots A, B, and C are used, and thus, it is possible to embody white light by emitting red light, green light, and blue light respectively emitted from three types of quantum dots which are excited by the ultraviolet light. As described above, in a case of being combined with such a backlight unit allowing each color light to exit, it is preferable that a reflective polarizing plate having the reflective properties described above is used as the reflective polarizing plate.

For example, a known quantum dot such as the quantum dots A, B, and C described above can be used as the quantum dot. It is preferable that the type of quantum dot to be used is determined according to the wavelength of the light source. Furthermore, light emitting properties of the quantum dot, in general, can be controlled according to a particle size. In general, light having a short wavelength is emitted as the particle size becomes smaller, and light having a long wavelength is emitted as the particle size becomes larger. A known technology can be applied to the wavelength conversion member containing a quantum dot without any limitation, and for example, the wavelength conversion member containing a quantum dot can be referred to JP2012-169271A, SID'12 DIGEST p. 895, and the like. In addition, a commercially available quantum dot sheet (for example, a quantum dot enhancement film (QDEF, manufactured by NANOSYS, INC) and the like) can be used as the wavelength conversion member.

(Light Emission Wavelength)

It is preferable a multi-wavelength light source is used from the viewpoint of realizing high brightness and high color reproducibility, as the backlight unit. It is more preferable that light emitted from the backlight unit includes at least blue light, green light, and red light.

In a preferred aspect, it is preferable that the backlight unit emits blue light which has a light emission center wavelength in a wavelength range of 400 to 499 nm and has a light emission intensity peak having a half-width of less than or equal to 100 nm, green light which has a light emission center wavelength in a wavelength range of 500 to 599 nm and has a light emission intensity peak having a half-width of less than or equal to 100 nm, and red light which has a light emission center wavelength in a wavelength range of 600 to 700 nm and has a light emission intensity peak having a half-width of less than or equal to 100 nm. Accordingly, it is possible to realize high brightness and high color reproducibility by a three-wavelength light source. In addition, by being combined with such a backlight unit having light emitting properties, as described above, it is also possible to thin the reflective polarizing plate. The wavelength range of the blue light is preferably 430 to 480 nm, and is more preferably 440 to 460 nm, from the viewpoint of further improving brightness and color reproducibility.

From the same viewpoint, the wavelength range of the green light is preferably 520 to 560 nm, and is more preferably 530 to 550 nm.

In addition, from the same viewpoint, the wavelength range of the red light is preferably 600 to 650 nm, and is more preferably 610 to 640 nm.

In addition, from the same viewpoint, the half-width of each light emission intensity of the blue light, the green light, and the red light is more preferably less than or equal to 80 nm, and is even more preferably less than or equal to 60 nm. Among them, the half-width of each light emission intensity of the blue light is particularly preferably less than or equal to 60 nm.

It is also preferable that the backlight unit further includes a known diffusion plate or a known diffusion sheet, a prism sheet (for example, Product Name of BEF or the like, manufactured by Sumitomo 3M limited), and a light guide. The other members are described in JP3416302B, JP3363565B, JP4091978B, JP3448626B, and the like, and the contents thereof are incorporate in the present invention.

In one embodiment of a liquid crystal display device, the liquid crystal display device includes a liquid crystal cell sandwiching a liquid crystal layer between two facing substrates of which at least one substrate includes an electrode, and the liquid crystal cell is configured by being disposed between two polarizing plates. The liquid crystal display device includes the liquid crystal cell in which liquid crystals are sealed between the upper and lower substrates, and an orientation state of the liquid crystal is changed by applying a voltage, and thus, an image is displayed. Further, as necessary, the liquid crystal display device includes a subsidiary functional layer such as a polarizing plate protective film or an optical compensation member performing optical compensation, and an adhesive layer. In addition, a surface layer such as a forward scattering layer, a primer layer, an antistatic layer, and an undercoat layer may be disposed along with (or instead of) a color filter substrate, a thin layer transistor substrate, a lens film, a diffusion sheet, a hard coat layer, an antireflection layer, a low reflective layer, an antiglare layer, and the like.

[Reflective Polarizing Plate and Manufacturing Method Thereof]

Still another aspect of the present invention relates to a reflective polarizing plate of which a degree of polarization $P_{550\ nm}$ with respect to light at a wavelength of 550 nm is greater than or equal to 99.90%; and a manufacturing method of the reflective polarizing plate described above, in which the reflective polarizing plate is a stretched film obtained by stretching a laminate of two or more layers of films, the stretched film is prepared through a stretching step in at least a film width direction and arbitrarily a stretching step in an film longitudinal direction, and in the stretching step in the film width direction, the laminate of the two or more layers of films is sequentially subjected to a stretching treatment under a first heating treatment, a cooling treatment, and a second heating treatment. The details of the polarizing plate described above and the manufacturing method thereof are as described above.

EXAMPLES

Hereinafter, the present invention will be described in more detail on the basis of examples. Materials, use amounts, ratios, treatment contents, treatment sequences, and the like of the following examples can be suitably changed unless the changes cause deviance from the gist of the present invention. Therefore, the range of the present invention will not be restrictively interpreted by the following specific examples. In addition, unless otherwise particularly stated, a temperature described below is an atmospheric temperature at which a described step is performed.

1. Preparation of Backlight Side Polarizing Plate (1) Preparation of PVA-Based Polarizing Plate Used in Liquid Crystal Display Device 101 (Comparative Example)

A polyvinyl alcohol (PVA) film, having a thickness of 80 μm was dipped in an aqueous solution of iodine having an iodine concentration of 0.05 mass % (a liquid temperature of 30° C.) for 60 seconds, and thus, was dyed. Next, the polyvinyl alcohol film was stretched in a longitudinal direction (a vertical direction) to be 5.0 times the original length while being dipped in an aqueous solution of a boric acid having a boric acid concentration of 4 mass % for 60 seconds, and then, was dried at 50° C. for 4 minutes, and thus, a polarizer (a PVA-based polarizer) having a thickness of 20 μm, which was formed of a polyvinyl alcohol-based film, was obtained.

A commercially available cellulose acylate film (TD80UL, manufactured by Fujifilm Corporation) was bonded onto both surfaces of the PVA-based polarizer described above by a polyvinyl alcohol-based adhesive as a protective film, and thus, a PVA-based polarizing plate was prepared.

(2) Preparation of Reflective Polarizing Plate A Used in Liquid Crystal Display Device 102 (Comparative Example)

Two different types of thermoplastic resin films were alternately laminated such that the total number of layers became 256, and were subjected to multilayer co-extrusion, and thus, a laminated film was molded. In a polyethylene terephthalate (PET) film described below, a refractive index in a stretching direction in which stretching described below was performed was 1.84, a refractive index in a direction orthogonal to the stretching direction in the plane was 1.57, and a refractive index in a thickness direction was 1.57. On the other hand, a refractive index of a copolyester (coPEN) film of a naphthalene dicarboxylic acid and a terephthalic acid or an isophthalic acid described below was isotropically 1.57. Specifically, the PET film was laminated as a first layer, and the coPEN film, was laminated on the first layer as a second layer, and then, the PET film (an odd-numbered layer) and the coPEN film (an even-numbered layer) were alternately laminated.

In the multilayer co-extrusion, the laminated film was divided into 8 regions (film units) in total, and the interval of slots in the co-extrusion was adjusted, and thus, the thickness of the odd-numbered layer, the thickness of the even-numbered layer, and the total thickness in each film unit were respectively controlled.

After that, the prepared laminated film was stretched only in the longitudinal direction at a stretching ratio of 4.0 times while being handled in a film longitudinal direction under an atmosphere of 90° C. (shown in the section of Pre Heating Temperature in Table 3). The number of odd-numbered layers (the PET films), the number of even-numbered layers (coPEN), a film thickness of one layer, and the total film thickness in each film unit of the laminated film (a reflective polarizing plate A) obtained as described above are shown in Table 1 described below. In the table, reference numbers were applied to the film units from a layer which became the lowermost layer at the time of being laminated towards the outermost layer, such as Film Unit 1, Film Unit 2, and the like. The same applies to Table 2 described below

TABLE 1

| Unit | Number of Layers | Number of Odd-Numbered Layers | Number of Even-Numbered Layers | Thickness of Odd-Numbered Layer (μm) | Thickness of Even-Numbered Layer (μm) | Total Film Thickness (μm) |
| --- | --- | --- | --- | --- | --- | --- |
| 1 | 32 | 16 | 16 | 0.053 | 0.062 | 1.84 |
| 2 | 32 | 16 | 16 | 0.058 | 0.068 | 2.03 |
| 3 | 32 | 16 | 16 | 0.065 | 0.076 | 2.24 |
| 4 | 32 | 16 | 16 | 0.071 | 0.084 | 2.48 |
| 5 | 32 | 16 | 16 | 0.079 | 0.092 | 2.74 |
| 6 | 32 | 16 | 16 | 0.088 | 0.103 | 3.05 |
| 7 | 32 | 16 | 16 | 0.098 | 0.115 | 3.40 |
| 8 | 32 | 16 | 16 | 0.109 | 0.127 | 3.78 |
| Total | 256 | 128 | 128 | 0.620 | 0.727 | 22 |

(3) Preparation of Reflective Polarizing B Used in Liquid Crystal Display Device 103 (Example)

A laminated film (the number of laminated layers of 256) was obtained by performing multilayer co-extrusion according to the same preparation method as that of the reflective polarizing plate A except that the odd-numbered layer was changed to a polyethylene terephthalate (PEN) film, and the even-numbered layer was changed to a polyethylene terephthalate (PET) film.

The obtained laminated film was stretched in the film longitudinal direction, and then, was stretched in the film width direction, and thus, a stretched film (a reflective polarizing plate 9) was prepared. Specifically, the stretching in the film longitudinal direction was performed in the longitudinal direction at a stretching ratio of 3.5 times under an atmosphere of 90° C., and the stretching in the film width direction was performed in the width direction at a stretching ratio of 3.5 times. More specifically, the stretching in the film width direction was performed by handling a film in a stretching device including a pre heating zone (90° C.), a first heating treatment zone (100° C.), a cooling treatment zone (80° C.), and a second heating treatment zone (220° C.) in this order towards the film handling direction, and by stretching the film in the film width direction in the first heating treatment zone.

(4) Preparation of Reflective Polarizing Plate C Used in Liquid Crystal Display Device 104 (Example)

A reflective polarizing plate C was obtained by performing the same steps as those in the preparation of the reflective polarizing plate B except that the stretching ratio in the film longitudinal direction was changed to 1.5 times, and the stretching ratio in the film width direction was changed to 4.0 times in the stretching step.

(5) Preparation of Reflective Polarizing Plate D Used in Liquid Crystal Display Device 105 (Example)

A reflective polarizing plate D was obtained by performing the same steps as those in the preparation of the reflective polarizing plate B except that the layer configuration was changed as shown in Table 2 described below.

plate and a backlight side polarizing plate were taken out, and the PVA-based polarizing plate prepared as described above was bonded by an acrylic resin-based easily adhesive layer (a thickness of 3 µm) instead of the visible side polarizing plate and the backlight side polarizing plate. The visible side polarizing plate and the backlight side polarizing plate were disposed such that transmission axes thereof were orthogonal to each other. The liquid crystal display device described above includes a white light source LED in a backlight unit as a light source, and further includes a light guide plate, a diffusion plate, and a prism sheet. In addition, a liquid crystal cell includes a thin layer transistor substrate, a liquid crystal layer, and a color filter substrate. In Table 3 described below, the backlight unit described above is shown as "White LED".

(2) Preparation of Liquid Crystal Display Devices 102 (Comparative Example), and 103 and 104 (Examples)

Liquid crystal display devices 102 to 104 were obtained by the same preparation method as that of the liquid crystal display device 101 except that each of the reflective polarizing plates B to E was used as the backlight side polarizing plate.

(3) Preparation of Liquid Crystal Display Devices 105 and 106 (Examples)

Liquid crystal display devices 105 and 106 were obtained by the same preparation method as that of the liquid crystal display device 101 except that the backlight unit was changed to a quantum dot (red (R), green (G), and blue (B) of narrow band) backlight unit described below and the reflective polarizing plate D or E was used as the backlight side polarizing plate.

TABLE 2

| Unit | Number of Layers | Number of Odd-Numbered Layers | Number of Even-Numbered Layers | Thickness of Odd-Numbered Layer (µm) | Thickness of Even-Numbered Layer (µm) | Total Film Thickness (µm) |
|---|---|---|---|---|---|---|
| 1 | 96 | 48 | 48 | 0.058 | 0.068 | 6.09 |
| 2 | 96 | 48 | 48 | 0.064 | 0.075 | 6.66 |
| 3 | 96 | 48 | 48 | 0.070 | 0.082 | 7.30 |
| 4 | 96 | 48 | 48 | 0.075 | 0.088 | 7.86 |
| 5 | 96 | 48 | 48 | 0.083 | 0.097 | 8.64 |
| 6 | 96 | 48 | 48 | 0.088 | 0.104 | 9.21 |
| Total | 576 | 288 | 288 | 0.44 | 0.51 | 46 |

(6) Preparation of Reflective Polarizing Plate E Used in Liquid Crystal Display Device 106 (Example)

A reflective polarizing plate E was obtained by performing the same steps as those in the preparation of the reflective polarizing plate D except that the laminated film was changed to the laminated film (Odd-Numbered Layer: PET Film, and Even-Numbered Layer: coPEN Film) used in the preparation of the reflective polarizing plate A.

2. Measurement of Degree of Polarization of Polarizing Plate

A degree of polarization of each of the prepared polarizing plates was measured by a spectrophotometer according to a measurement method of a degree of polarization of a polarizing plate described in Japan Electronics and Information Technology Industries Association Standards EIAJ ED-2521B 5-18.

3. Preparation of Liquid Crystal Display Device (1) Preparation of Liquid Crystal Display Device 101 (Comparative Example)

A commercially available liquid crystal display device (Product Name of TH-L42D2, manufactured by Panasonic Corporation) was disassembled, a visible side polarizing The used quantum dot backlight unit includes a blue light emitting diode (B-LED, manufactured by NICHIA CORPORATION, a main wavelength of 465 nm, and a half-width of 20 nm) as a light source. In addition, a wavelength conversion member containing a quantum dot which emits green light having a center wavelength of 535 nm and a half-width of 40 nm when blue light exiting from the blue light emitting diode is incident thereon, and a quantum dot which emits red light having a center wavelength of 630 nm and a half-width of 40 nm is included in the front portion of the light source. In addition, a light guide plate, a diffusion plate, and a prism sheet are also included in addition to the light source. In Table 3 described below, the backlight unit described above is shown as "QDOT".

4. Evaluation of Liquid Crystal Display Device (1) Front Contrast (CR)

A brightness value of black display and white display in a normal direction of a display surface was measured in a darkroom by using a luminance colorimeter (BM5A manufactured by TOPCON TECHNOHOUSE CORPORATION.), and thus, front contrast (White Brightness/Black Brightness) was calculated.

(2) Evaluation of Coloration in Front Black Display

In visual sensory evaluation, coloration in front black display was evaluated on the basis of the following evaluation standard.

A: No Coloration
B: Slight Coloration in Blue Direction
C: Coloration in Blue Direction (3) Color Reproduction Range A color reproduction range (an NTSC ratio) was evaluated from the results obtained by using a luminance colorimeter (BM5A manufactured by TOPCON TECHNOHOUSE CORPORATION.) on the basis of the following evaluation standard.

A: NTSC Ratio: 100%
B: NTSC Ratio: 72%

(4) Photoelastic Unevenness

The liquid crystal display device was left to stand in lighting at a high temperature (60° C.), and a light leakage (photoelastic unevenness) in black display was subjected to visual sensory evaluation, and thus, was evaluated on the basis of the following evaluation standard.

A: Small Photoelastic Unevenness
B: Large Photoelastic Unevenness

The outlines and the evaluation results of the examples and the comparative examples described above are shown in Table 3 described below.

The present invention is useful in the manufacturing field of a liquid crystal display device.

What is claimed is:

1. A liquid crystal panel, comprising:
a visible side polarizing plate;
a liquid crystal cell; and
a backlight side polarizing plate,
wherein the backlight side polarizing plate is a reflective polarizing plate of which a degree of polarization $P_{550\ nm}$ with respect to light at a wavelength of 550 nm is greater than or equal to 99.90%,
wherein the reflective polarizing plate and the liquid crystal cell are integrally laminated, and
wherein in the reflective polarizing plate, a degree of polarization $P_{450\ nm}$ with respect to light at a wavelength of 450 nm, a degree of polarization $P_{550\ nm}$ with respect to light at a wavelength of 550 nm, and a degree of polarization $P_{630\ nm}$ with respect to light at a wavelength of 630 nm satisfy at least one of Expression (1-1) or (2-1) described below $$0.00\% < |P_{450\ nm} - P_{550\ nm}| < 0.10\% \quad (1\text{-}1)$$

$$0.00\% < |P_{550\ nm} - P_{630\ nm}| < 0.10\% \quad (2\text{-}1).$$

2. The liquid crystal panel according to claim 1, wherein the reflective polarizing plate satisfies Expression (1-1) and Expression (2-1) described above.

TABLE 3

| | Liquid Crystal Display Device | 101 | 102 | 103 | 104 | 105 | 106 |
|---|---|---|---|---|---|---|---|
| | Examples/Comparative Examples | Comparative Example | Comparative Example | Example | Example | Example | Example |
| | Laminated Form of Liquid Crystal Cell and Backlight Side Polarizing Plate | Integrally Laminated | Integrally Laminated | Integrally Laminated | Integrally Laminated | Integrally Laminated | Integrally Laminated |
| Configuration | Backlight Side Polarizing Plate | PVA-Based Polarizing Plate | Reflective Polarizing Plate A | Reflective Polarizing Plate B | Reflective Polarizing Plate C | Reflective Polarizing Plate D | Reflective Polarizing Plate E |
| | Thickness of Backlight Side Polarizing Plate | 180 μm | 22 μm | 22 μm | 22 μm | 46 μm | 46 μm |
| | Degree of Polarization $P_{450\ nm}$ of Backlight Side Polarizing Plate | 99.97% | 90.10% | 99.97% | 99.98% | 99.98% | 99.89% |
| | Degree of Polarization $P_{550\ nm}$ of Backlight Side Polarizing Plate | 99.93% | 90.10% | 99.97% | 99.99% | 99.99% | 99.92% |
| | Degree of Polarization $P_{630\ nm}$ of Backlight Side Polarizing Plate | 99.97% | 90.10% | 99.97% | 99.98% | 99.98% | 99.89% |
| | Wavelength Dependency of Degree of Polarization of Backlight Side Polarizing Plate $|P_{450\ nm} - P_{550\ nm}|$ | 0.04% | 0.00% | 0.00% | 0.01% | 0.01% | 0.03% |
| | Wavelength Dependency of Degree of Polarization of Backlight Side Polarizing Plate $|P_{550\ nm} - P_{630\ nm}|$ | 0.04% | 0.00% | 0.00% | 0.01% | 0.01% | 0.03% |
| | Backlight | White LED | White LED | White LED | White LED | QDOT | QDOT |
| | Stretching Ratio (Longitudinal Direction) | 5.0 | 4.0 | 3.5 | 1.5 | 3.5 | 3.5 |
| | Pre Heating Temperature (° C.) | — | 90 | 90 | 90 | 90 | 90 |
| | Heating Temperature in First Heating Treatment (° C.) | — | — | 100 | 100 | 100 | 100 |
| | Stretching Ratio (Width Direction) | — Stretched | Not being | 3.5 | 4.0 | 3.5 | 3.5 |
| | Cooling Temperature in Cooling Treatment (° C.) | — | — | 80 | 80 | 80 | 80 |
| | Heating Temperature in Second Heating Treatment (° C.) | — | — | 220 | 220 | 220 | 220 |
| Evaluation Result | Photoelastic Unevenness | C | A | A | A | A | A |
| | Front CR | 3500 | 10 | 3500 | 3500 | 3500 | 1250 |
| | Front Black Tint | C | B | B | A | A | A |
| | Color Reproduction Range | B | B | B | B | A | A |

3. The liquid crystal panel according to claim 1,
wherein the liquid crystal cell and the reflective polarizing plate are integrally laminated through at least one easily adhesive layer.

4. The liquid crystal panel according to claim 1,
wherein the reflective polarizing plate includes a stretched film of a laminate of two or more layers selected from the group consisting of a polyethylene naphthalate film and a polyethylene terephthalate film as a reflective polarizer.

5. The liquid crystal panel according to claim 1,
wherein the visible side polarizing plate includes a polyvinyl alcohol-based film as a polarizer.

6. The liquid crystal panel according to claim 1,
wherein the visible side polarizing plate and the reflective polarizing plate are arranged such that transmission axes thereof are orthogonal to each other.

7. A liquid crystal display device, comprising:
the liquid crystal panel according to claim 1; and
a backlight unit.

8. The liquid crystal display device according to claim 7,
wherein the backlight unit emits at least blue light which has a light emission center wavelength in a wavelength range of 400 to 499 nm and has a light emission intensity peak having a half-width of less than or equal to 100 nm.

9. The liquid crystal display device according to claim 7,
wherein the backlight unit emits,
blue light which has a light emission center wavelength in a wavelength range of 400 to 499 nm and has a light emission intensity peak having a half-width of less than or equal to 100 nm,
green light which has a light emission center wavelength in a wavelength range of 500 to 599 nm and has a light emission intensity peak having a half-width of less than or equal to 100 nm, and
red light which has a light emission center wavelength in a wavelength range of 600 to 700 nm and has a light emission intensity peak having a half-width of less than or equal to 100 nm.

10. The liquid crystal display device according to claim 7,
wherein the backlight unit includes a wavelength conversion member containing a quantum dot which is excited by exciting light and emits fluorescent light.

11. The liquid crystal display device according to claim 10,
wherein the quantum dot contained in the wavelength conversion member is at least one type selected from the group consisting of
a quantum dot A having a light emission center wavelength in a wavelength range of 600 nm to 700 nm,
a quantum dot B having a light emission center wavelength in a wavelength range of 500 nm to 599 nm, and
a quantum dot C having a light emission center wavelength in a wavelength range of 400 nm to 499 nm.

12. The liquid crystal display device according to claim 11,
wherein the backlight unit includes a light source emitting blue light which has a light emission center wavelength in a wavelength range of 400 to 499 nm and has a light emission intensity peak having a half-width of less than or equal to 100 nm,
the wavelength conversion member contains the quantum dot A and the quantum dot B, and
the wavelength conversion member is disposed between the light source and the liquid crystal panel.

13. A reflective polarizing plate of which a degree of polarization $P_{550\ nm}$ with respect to light at a wavelength of 550 nm is greater than or equal to 99.90%,
wherein a degree of polarization $P_{450\ nm}$ with respect to light at a wavelength of 450 nm, a degree of polarization $P_{550\ nm}$ with respect to light at a wavelength of 550 nm, and a degree of polarization $P_{630\ nm}$ with respect to light at a wavelength of 630 nm satisfy at least one of Expression (1-1) or (2-1) described below $$0.00\% < |P_{450\ nm} - P_{550\ nm}| < 0.10\% \tag{1-1}$$

$$0.00\% < |P_{550\ nm} - P_{630\ nm}| < 0.10\% \tag{2-1}$$

14. The reflective polarizing plate according to claim 13, which satisfies Expression (1-1) and Expression (2-1) described above.

15. A manufacturing method of a reflective polarizing plate,
wherein the reflective polarizing plate is the reflective polarizing plate according to claim 13,
the reflective polarizing plate is a stretched film obtained by stretching a laminate of two or more layers of films,
the stretched film is prepared through a stretching step in at least a film width direction, and
in the stretching step in the film width direction, the laminate of the two or more layers of films is sequentially subjected to a stretching treatment under a first heating treatment, a cooling treatment, and a second heating treatment.

16. The manufacturing method according to claim 15,
wherein the second heating treatment is performed at a heating temperature higher than or equal to a heating temperature of the first heating treatment.

17. The manufacturing method according to claim 15,
wherein the laminate is a laminate of two or more layers selected from the group consisting of a polyethylene naphthalate film and a polyethylene terephthalate film.

* * * * *